May 30, 1933.  W. H. KITTO  1,911,367
SPRAYING DEVICE
Filed April 4, 1931  2 Sheets-Sheet 1
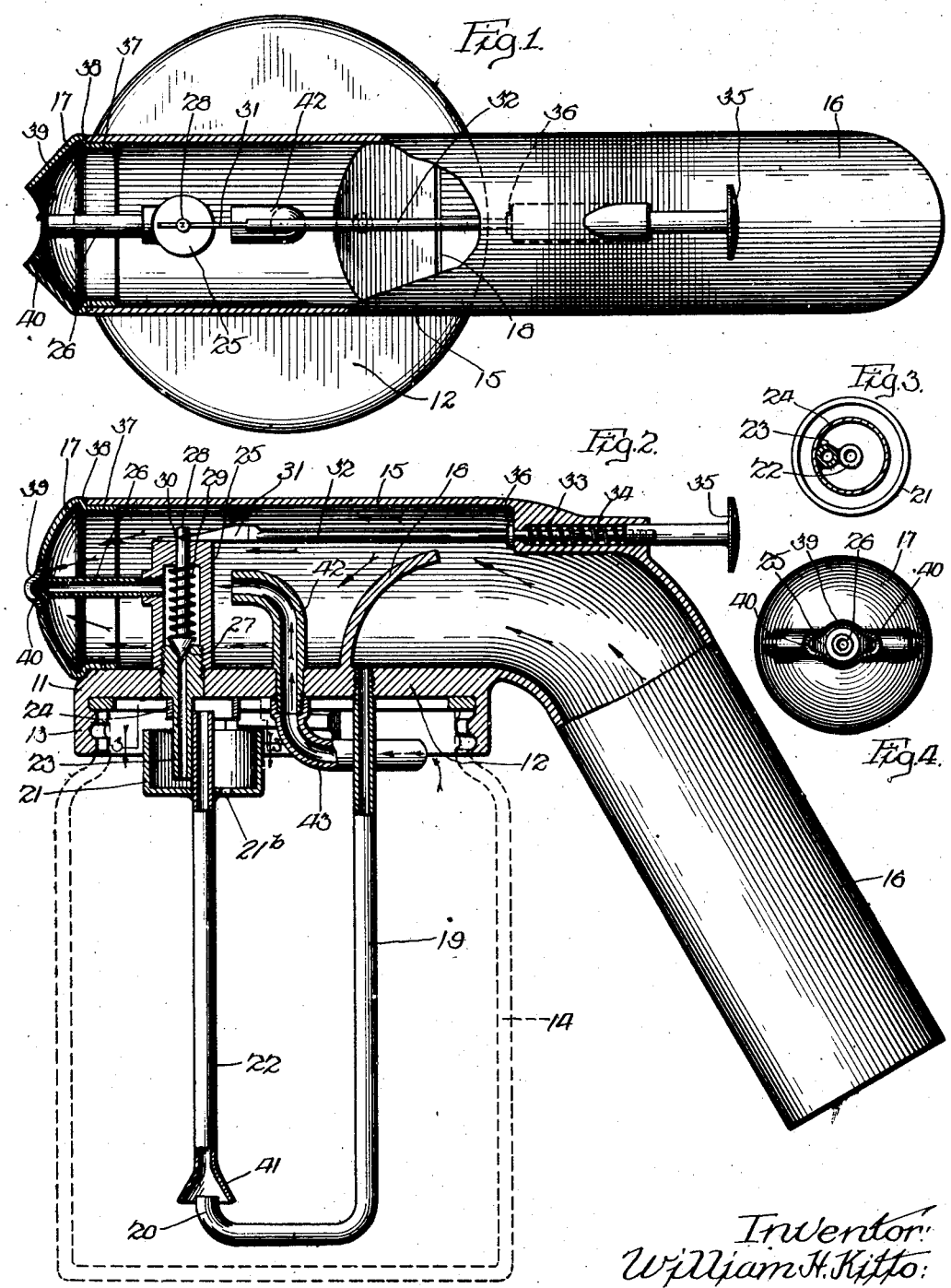
Inventor:
William H. Kitto:
By Harry S. Drurer
Atty

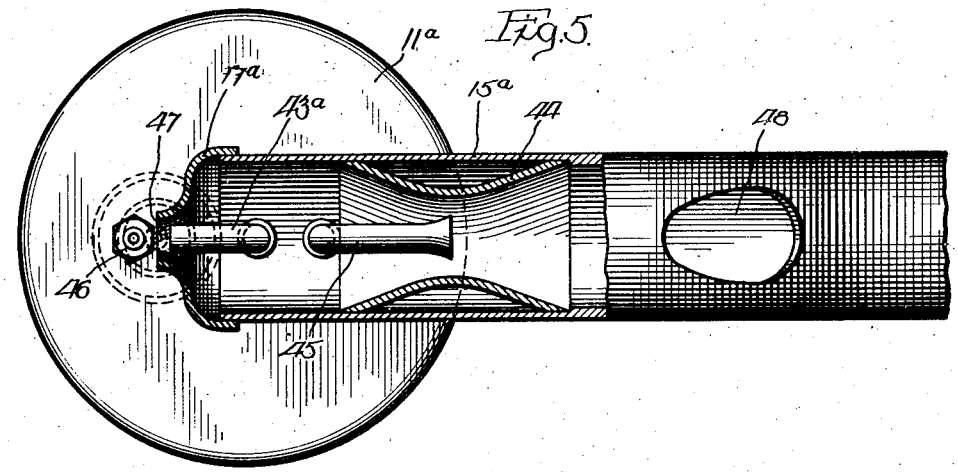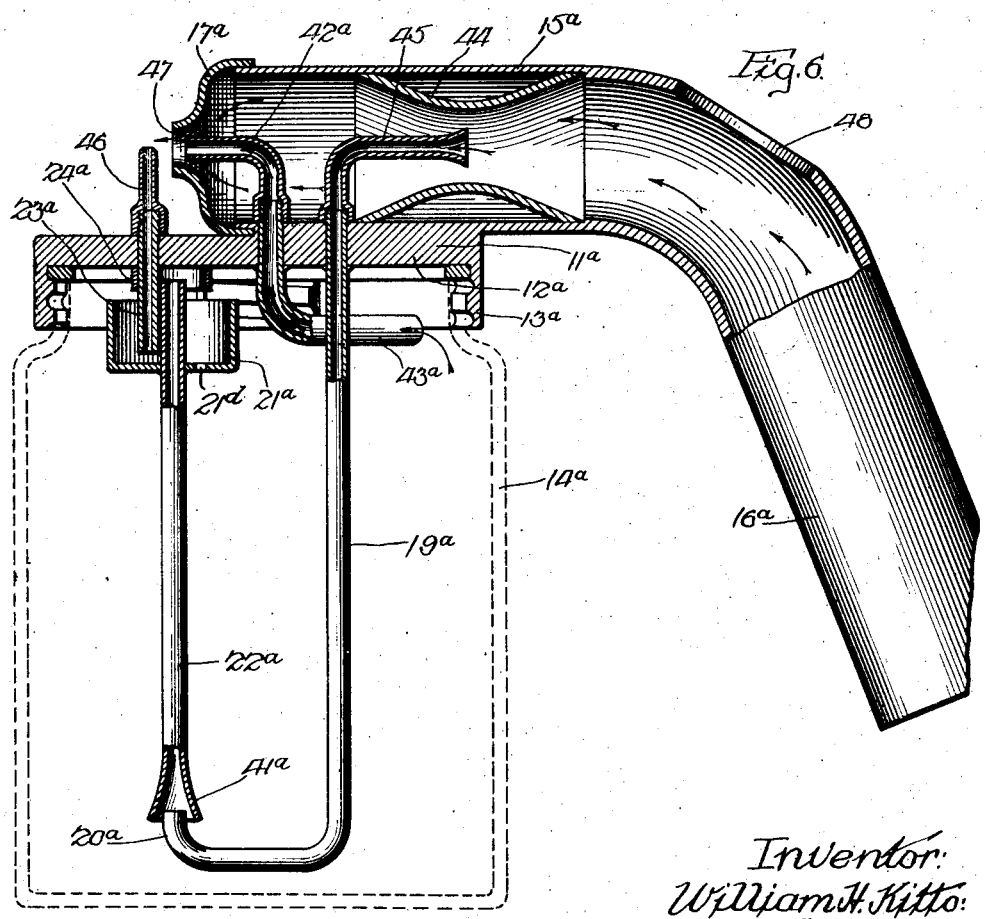

Patented May 30, 1933

1,911,367

UNITED STATES PATENT OFFICE

WILLIAM H. KITTO, OF CANTON, OHIO, ASSIGNOR TO THE HOOVER COMPANY, OF NORTH CANTON, OHIO, A CORPORATION OF OHIO

SPRAYING DEVICE

Application filed April 4, 1931. Serial No. 527,657.

This invention relates to spraying devices of the type in which a liquid is atomized by and mixed with a current of air. The invention is shown and described as embodied in an apparatus for the use of a comparatively large and continuous flow of air under comparatively low pressure, such as may be obtained by connection to the outlet of a suction cleaner. Devices of this nature are usually portable and utilize a container for the liquid, the size of which is determined by the weight of liquid which may be conveniently supported by the hand, preferably a glass jar of a size and shape marketed in large numbers.

One of the objects of the invention is to provide a device of this type by which a uniform mixture will be maintained automatically regardless of the height of liquid in the container. A further object is to provide a device for this purpose which will be simple in construction, and which can be economically manufactured and readily assembled and disassembled for cleaning, adjustment or repair. A still further object is to provide a device which may be readily controlled to vary the rate of spraying and which will, under all conditions, maintain a spray of uniform density and prevent the discharge of large drops of liquid, or dribbling when the spraying action is stopped. Still further objects of the invention and novel features of invention and operation will be apparent from the following specification when read with reference to the accompanying drawings, in which:

Fig. 1 is a plan view, partly in broken section, of a spraying device embodying the invention;

Fig. 2 is a view in side elevation, partly in vertical section, of the structure shown in Fig. 1;

Fig. 3 is a view in horizontal section, taken on line 3—3 of Fig. 2;

Fig. 4 is a view in front elevation of the nozzle shown in Figs. 1 and 2;

Fig. 5 is a plan view, similar to Fig. 1, but showing a modified embodiment of the invention; and—

Fig. 6 is a view in side elevation, partly in section, of the structure shown in Fig. 4.

In each of the modifications shown a part of the air stream is directed downwardly into the container and utilized to operate as a gas-lift pump to fill a small auxiliary reservoir in the top of the container. This reservoir is kept full, the excess liquid overflowing, and constitutes a constant-level supply for the short liquid tube which leads to the nozzle. Two types of nozzles are shown, that of Figs. 1, 2, 3 and 4 being of the concentric discharge type in which the liquid supply conduit is directed laterally and positioned concentrically in the air nozzle, and that of Figs. 4 and 5 being of the aspirating type, in which the air nozzle discharges across the open top of an upwardly directed liquid supply tube. In each case a definite flow of air into and out of the container is maintained, the outlet being by a tube leading from a point above the surface of the liquid near the top of the container to a point of reduced pressure in the air blast tube. This current of air is utilized to keep the auxiliary reservoir full and so maintain a uniform density of spray regardless of the height of liquid in the container.

In the embodiment shown in Figs. 1, 2 and 3, a main casting 11 is provided with a round cap portion 12 having a depending flange with a thread, which is preferably interrupted, to fit upon the top of a glass jar 14, or similar container, the usual gasket being used to form a tight joint. The casting includes a large horizontally extending blast tube 15, extending across the top of the cap portion 12, and continuous with a downwardly extending air-supply tube portion 16, which is adapted to be attached by a flexible hose to the outlet of a suction cleaner or similar supply of compressed air. The size and inclination of the tube portion 16 is preferably such that it may be readily used as a handle by which the sprayer and its contents may be supported so as to direct the spray as desired. A nozzle cap 17, preferably formed of sheet metal, is frictionally mounted on the forward end of the blast tube 15.

A baffle 18 projects part way across the blast tube 15 from the bottom thereof and the cap portion 12 is perforated just back of the baffle 18, to receive a tube 19 which is threaded or otherwise suitably secured therein. The lower end of the tube 19 extends to a point adjacent the bottom of the jar 14 where it is bent laterally and then terminates in a short upturned end 20. The tube for supplying liquid to the nozzle is preferably formed in several parts, to facilitate assembly and permit it to be easily cleaned. A cup, or auxiliary reservoir 21 is secured adjacent the top of a vertical pipe 22, and from within the reservoir 21 a short vertical pipe 23 extends, being secured to the side of the pipe 22, as shown. A small drain vent 21$^b$ being provided in the base of the reservoir 21, if desired, to permit the reservoir to drain and avoid spilling of the liquid when the cap 12 is removed. A drip ring 24 surrounds the open top of the pipe 22, being secured to the side of the pipe 23, as shown, and acting both as an abutment to determine the position of the parts relative to the cap, and to direct the liquid from the top of the pipe 22 down into the reservoir 21. Pipe 22, cup 21, pipe 23 and ring 24 may be conveniently secured together as a unit by soldering or sweating the parts together, as shown, but any other suitable means of assembly may be employed. The enlarged upper end of the pipe 23 extends through the cap 12 and an enlarged head or elbow 25 is threaded upon the upper end of the pipe 23 and engages the upper side of the cap 12 to secure the entire assembly. A horizontally extending tube 26 is threaded, or otherwise secured to the head 25, and a valve is provided in the head 25, comprising a conical end 27 fitting in a corresponding seat in the top of the pipe 23, and having a stem 28 which extends through the top of the head 25, a spring 29 surrounding the stem 28 and normally holding the valve closed. The upper end of the stem 28 is slotted at 30 to receive the forward wedge-shaped end 31 of a valve-operating rod 32. This rod 32 extends rearwardly through the wall of the blast tube, the wall being preferably provided with a recess 33 to house a spring 34 which surrounds the rod and acts against a thumb piece 35, which is threaded upon the end of the rod, to hold the rod in its rearward position, as determined by the engagement of a collar or abutment 36 on the rod with the inner wall of the tube. If desired, the rod 32 and the opening in the wall of the tube through which it extends may be of non-circular cross section to hold it from rotation, and it will be apparent that the thumb-piece 35 is so positioned that it may be conveniently operated by the thumb of the hand which supports the device.

The nozzle cap 17 is preferably provided with a flange 37 which is frictionally received within the end of the blast tube and with an abutment 38 engaging the end of the blast tube to define its position accurately. The central portion of the nozzle cap is bent outwardly and formed with a blast opening 39 which may be circular if desired, but which is preferably distorted from circular shape by the formation of short channels 40 at diametrically opposite points, as best shown in Fig. 4. These channels 40 permit greater flow at the sides of the liquid tube 26 and direct cross currents of air which, meeting in a central plane, effect a flat spray, that is, cause the particles of liquid to diverge more widely in a vertical direction than in a horizontal direction, with the cap in the position shown.

The lower end of the pipe 22 is flared outwardly at 41 to form a conical mouth and the upturned end 20 of the tube 19 projects slightly into such mouth. To prevent a building up of pressure above the surface of the liquid equal to that in the blast tube, a tube 42 is provided which extends through the cap 12 and is directed forwardly at its upper end. The tube 42 is held in place by a tube 43, below the cap 12, which is threaded to the lower end of tube 42 and is bent, preferably upwardly, to prevent accidental entry of liquid therein.

In the modification shown in Figs. 5 and 6, the invention is embodied in a sprayer of the aspirating type and the operation is shown as controlled by venting the main air flow to atmosphere. A main casting 11$^a$, comprising a cap 12$^a$ and a portion 13$^a$ for threaded engagement with a jar 14$^a$, is provided with a horizontal blast tube 15$^a$ in continuation of a handle tube portion 16$^a$, the forward end of the blast tube having a detachable cap 17$^a$ frictionally held thereon. A Venturi tube 44 is inserted in the blast tube 15$^a$ and held in place therein by a bent tube 45, the end of which extends back to the throat of the Venturi tube and which connects with and is threaded upon the upper end of the vertical tube 19$^a$. The upturned end 20$^a$ of tube 19$^a$ is received in the lower flared end 41$^a$ of tube 22$^a$, which conducts the liquid to reservoir 21$^a$, and a short liquid tube 23$^a$ extends upwardly from reservoir 21$^a$, and the whole assembly is positioned by a drip ring 24$^a$, secured to tube 23$^a$, as in the prior modification, a drain vent 21$^d$ being provided, if desired. A liquid nozzle 46 is threaded upon the upper end of the tube 23$^a$ and extends upwardly to a point in front of the air-blast opening 47 in the cap 17$^a$, which is here shown as circular to effect a substantially circular spray pattern.

A pressure reducing vent, for insuring the operation of the gas-lift pump, is provided by a bent tube 43$^a$, similar to tube 43 in Fig.

2, upon which a bent tube 42ª is threaded, extending forwardly to a point almost in the plane of the air-blast opening 47. It is necessary that the forward end of the tube 42ª be at a point at which the pressure is lower than that in the tube 45, when air is flowing through the blast tube 15ª, and it is preferable that such point be a point of atmospheric pressure. It will be appreciated that varying the relationship between the air blast nozzle 47 and the forward end of tube 42ª varies the pressure which will be maintained above the surface of the liquid in the container, and hence the operation of the gas-lift pump. To vary the rate of spray from zero to a maximum, an opening 48 is provided in the top of the tubular air-supplying handle 16ª, where it joins the blast 15ª, such opening being so located and of such size that it may be conveniently closed by the thumb of the hand by which the device is supported.

In the modification shown in Figs. 1 to 4, the air blast is continuous, and the shape and force of the blast will be determined by the shape and size of the air-blast opening, as described heretofore. A constant flow of air will be maintained down pipe 19, up through pipe 22, carrying with it liquid to keep reservoir 21 overflowing, and through pipes 43 and 42 back into the main air stream in the blast tube 15. As the thumb piece 35, and the wedge 31, are pushed forward valve member 27 will be raised to permit liquid to be drawn from the reservoir 21 by the aspirating action of the air blast upon the end of the horizontal liquid supply tube 26, and the air mixed with the small particles of liquid will be projected as a spray, and the liquid content of the spray will vary with the size of the valve opening. It will be apparent that, whatever the height of the liquid in the container 14, the liquid head which must be overcome by the aspirating action is constant, as the liquid level in the reservoir 21 remains constant and, when the valve 27 is closed, there can be no "dribbling" or blowing of drops of liquid by the air blast.

In the modified structure shown in Figs. 5 and 6, the density of the spray is controlled by varying the air flow through the blast-tube 15ª and the air-blast opening 47. Since the area of the opening 48 is of much greater area than that at the throat of the Venturi tube 44, there will be only a slight flow of air through the air-blast opening 47 when the opening 48 is uncovered, and the flow may be gradually increased to a maximum as the opening 48 is gradually closed. The liquid nozzle 46 is so placed that the minimum air flow, when opening 48 is uncovered, has insufficient aspirating effect to lift liquid from the reservoir 21ª, so that there can be no spraying or "dribbling" under such conditions. The flow of air from the throat of the Venturi tube 44 down tube 19ª and up through tube 22ª, escaping through pipes 43ª and 42ª, is sufficient to raise the liquid and maintain an overflow from the reservoir 21ª. When the opening 48 is partly closed, the pressure in the blast tube 15ª is increased, and the force of the air blast from the opening 47 has sufficient aspirating effect on the liquid nozzle 46 to overcome the liquid head above the top of reservoir 21ª and spraying begins, the pressure in the blast tube, velocity of the air stream at the nozzle and hence the liquid content of the spray gradually increasing as the opening 48 is further closed.

In both modifications, it will be apparent that the density of spray can be gradually varied, by simple means, from a condition in which there is no liquid in the air stream to whatever density may be desired, and that the action of the device as a whole is entirely independent of the level of the liquid in the container at any moment. The structures are simple, may be easily cleaned, and may be readily operated by one hand. While several embodiments of the invention have been shown and described, it will be understood that various changes may be made in the structural details within the scope of the invention, which is defined in the following claims.

I claim:

1. A spraying device, comprising an air supply tube having a reduced nozzle, a closed liquid container secured to and below said tube, a liquid supply tube having an outlet in aspirating relation with respect to said nozzle, and a gas lift pump for supplying liquid to said liquid tube from said container including a tube connected to said air supply tube and an outlet tube communicating with the space above the liquid in said container and having its end extending forwardly within said air supply tube.

2. A portable spraying device, comprising an air supply tube having a nozzle, a liquid container secured to and below said tube, a constant level reservoir in fixed relation with and adjacent said nozzle, a liquid supply conduit communicating with said reservoir and having an outlet in aspirating relation with respect to said nozzle, and pumping means responsive to air flow in said air supply tube for continuously supplying liquid from said container to said constant level reservoir.

3. A portable spraying device, comprising an air supply tube having a nozzle, a liquid container below and secured to said tube, a cup adjacent said nozzle and adapted to overflow into said container, a liquid supply tube communicating with said cup and having an outlet in aspirating relation with respect to said nozzle, and means responsive to air flow in said air supply tube for raising liquid from said container to said cup.

4. A portable spraying device, comprising an air supply tube having a nozzle, a liquid container below and secured to said tube, a cup adjacent said nozzle within the upper portion of said container and adapted to overflow into said container, a liquid supply conduit communicating with said cup and having an outlet in aspirating relation with respect to said nozzle, and a gas-lift pump in said container for raising liquid from said container to said cup.

5. A spraying device, comprising an air supply tube having a nozzle, a liquid container below and in fixed relation to said air tube, a cup adjacent said nozzle and adapted to overflow into said container, a liquid supply conduit communicating with said cup and having an outlet in aspirating relation with respect to said nozzle, and means carried by said air tube and projecting into said container operably responsive to air flow in said air supply tube for raising liquid from said container to said cup.

6. A spraying device, comprising an air supply tube having a nozzle, a liquid container below and secured to said tube, an overflow cup adjacent said nozzle within the upper portion of said container, a liquid supply conduit communicating with said cup and having an outlet in aspirating relation with respect to said nozzle, and means responsive to a difference in air pressure between the air supply tube and the space in the top portion of said container for raising liquid from said container to said cup.

7. A spraying device, comprising an air supply tube having a nozzle, a liquid container detachably secured to and below said tube, a constant level reservoir in fixed relation to and adjacent said nozzle, a liquid supply conduit communicating with said reservoir and having an outlet in aspirating relation with respect to said nozzle, means responsive to air flow in said air supply tube for continuously supplying liquid from said container to said constant level reservoir, and manually actuable means for controlling the flow of liquid in said liquid conduit.

8. A spraying device, comprising an air supply tube having a nozzle, a liquid container secured to and below said nozzle, a cup arranged in fixed relation to said nozzle and to overflow into said container, a liquid supply tube communicating with said cup and having an outlet in aspirating relation with respect to said nozzle, a Venturi tube within said air supply tube, and a gas-lift pump for raising liquid from said container to said cup including a tube having an inlet positioned in the throat of said Venturi tube.

9. A portable spraying device, comprising an air supply tube having a nozzle, a liquid container secured to and below said tube, a cup carried by said tube adjacent said nozzle and arranged to overflow into said container, a liquid supply conduit communicating with said cup and having an outlet in aspirating relation with respect to said nozzle, an upwardly extending secondary tube connecting the lower part of said container with said cup, and a primary tube in communication with said air supply tube and arranged to discharge upwardly into the lower end of said upwardly extending secondary tube, the space above the liquid in said container being vented to maintain therein a pressure below that in said primary tube.

Signed at North Canton, in the county of Stark, and State of Ohio, this 20th day of March, 1931.

WILLIAM H. KITTO.